United States Patent
Ivchenko

(10) Patent No.: US 9,779,136 B2
(45) Date of Patent: Oct. 3, 2017

(54) REARRANGING SEARCH OPERATORS

(71) Applicant: LinkedIn Corporation, Mountain View, CA (US)

(72) Inventor: Dmytro Andriyovich Ivchenko, Mountain View, CA (US)

(73) Assignee: LinkedIn Corporation, Sunnyvale, CA (US)

(*) Notice: Subject to any disclaimer, the term of this patent is extended or adjusted under 35 U.S.C. 154(b) by 296 days.

(21) Appl. No.: 14/584,754

(22) Filed: Dec. 29, 2014

(65) Prior Publication Data

US 2016/0092508 A1    Mar. 31, 2016

Related U.S. Application Data

(60) Provisional application No. 62/057,983, filed on Sep. 30, 2014.

(51) Int. Cl.
*G06F 17/30* (2006.01)

(52) U.S. Cl.
CPC .... *G06F 17/30448* (2013.01); *G06F 17/3066* (2013.01); *G06F 17/30554* (2013.01); *G06F 17/30696* (2013.01)

(58) Field of Classification Search
CPC ......... G06F 17/30448; G06F 17/30554; G06F 17/30696; G06F 17/3066
USPC ....................................................... 707/713
See application file for complete search history.

(56) References Cited

U.S. PATENT DOCUMENTS

| | | | | |
|---|---|---|---|---|
| 6,169,992 B1 * | 1/2001 | Beall | ................ | G06F 17/30607 |
| 6,430,552 B1 * | 8/2002 | Corston-Oliver | . | G06F 17/30389 |
| 8,019,750 B2 * | 9/2011 | Kosciusko | ........ | G06F 17/30306 |
| | | | | 707/718 |
| 8,489,580 B2 * | 7/2013 | Kulkarni | .......... | G06F 17/30442 |
| | | | | 707/713 |
| 8,521,723 B1 * | 8/2013 | Ahmed | ............. | G06F 17/30448 |
| | | | | 707/714 |

(Continued)

FOREIGN PATENT DOCUMENTS

WO    WO 2012058690 A2 *    5/2012    ....... G06F 17/30672

OTHER PUBLICATIONS

Siren Manual—Text Search Syntax, 4 pages, accessed online at <http://siren.solutions/manual/text-search-syntax.html> on May 24, 2017.*

(Continued)

*Primary Examiner* — Phuong Thao Cao

(74) *Attorney, Agent, or Firm* — Schwegman Lundberg & Woessner, P.A.

(57) ABSTRACT

A system and method for rearranging search operators of a search query are disclosed. In some example embodiments, a first initial search query is received from a first user. The first initial search query comprises at least one search operator and at least one search term. A first rewritten search query is generated based on the first initial search query. The generating of the first rewritten search query comprises rewriting at least one optional search operator in the first initial search query using at least one required search operator and at least one exclusion search operator in response to a determination that the first initial search query comprises the at least one optional search operator and does not comprise any required search operators. A first set of search results is generated for the first rewritten search query and caused to be presented to the first user.

20 Claims, 12 Drawing Sheets

(56) References Cited

U.S. PATENT DOCUMENTS

| | | | |
|---|---|---|---|
| 8,909,619 B1* | 12/2014 | Riley | G06F 17/30867 707/722 |
| 9,146,984 B1* | 9/2015 | Bozkaya | G06F 17/30339 |
| 9,519,662 B2* | 12/2016 | Beavin | G06F 17/30289 |
| 2004/0225643 A1* | 11/2004 | Alpha | G06F 17/3064 |
| 2005/0210010 A1* | 9/2005 | Larson | G06F 17/30522 |
| 2007/0162273 A1* | 7/2007 | Ruiz | G06F 17/27 704/9 |
| 2007/0203893 A1* | 8/2007 | Krinsky | G06F 17/30864 |
| 2007/0276825 A1* | 11/2007 | Dettinger | G06F 17/30392 |
| 2007/0299834 A1* | 12/2007 | Liu | G06F 17/30935 |
| 2008/0065603 A1* | 3/2008 | Carlson | G06F 17/30864 |
| 2009/0024593 A1* | 1/2009 | Allen | G06F 17/30398 |
| 2009/0144262 A1* | 6/2009 | White | G06F 17/30389 |
| 2009/0228439 A1* | 9/2009 | Manolescu | G06F 17/30864 |
| 2009/0240675 A1* | 9/2009 | Asai | G06F 17/3066 |
| 2010/0191758 A1* | 7/2010 | Peng | G06F 17/30864 707/759 |
| 2010/0312756 A1* | 12/2010 | Zhang | G06F 17/30938 707/693 |
| 2011/0004588 A1* | 1/2011 | Leitersdorf | G06F 17/30864 707/711 |
| 2011/0093485 A1* | 4/2011 | Chang | G06F 17/30935 707/759 |
| 2011/0295833 A1* | 12/2011 | Narasayya | G06F 11/3664 707/713 |
| 2012/0203750 A1* | 8/2012 | Vaananen | G06F 17/30528 707/706 |
| 2012/0246173 A1* | 9/2012 | Wittmer | G06F 17/30991 707/749 |
| 2012/0303648 A1* | 11/2012 | Goldfarb | G06F 17/2775 707/760 |
| 2012/0323885 A1* | 12/2012 | Wang | G06F 17/30448 707/714 |
| 2013/0110827 A1* | 5/2013 | Nabar | G06Q 10/00 707/728 |
| 2013/0159278 A1* | 6/2013 | Liu | G06F 17/30427 707/713 |
| 2013/0246365 A1* | 9/2013 | Hornkvist | G06F 17/30106 707/651 |
| 2013/0325841 A1* | 12/2013 | Ahmed | G06F 17/30448 707/713 |
| 2014/0222856 A1* | 8/2014 | Lakshminath | G06F 17/30011 707/769 |
| 2014/0250097 A1* | 9/2014 | Shtilman | G06F 17/30563 707/709 |
| 2014/0358894 A1* | 12/2014 | Wei | G06F 17/30442 707/713 |
| 2014/0379690 A1* | 12/2014 | Ahmed | G06F 17/30448 707/713 |
| 2015/0074135 A1* | 3/2015 | Beavin | G06F 17/30448 707/759 |
| 2015/0220597 A1* | 8/2015 | Simhadri | G06F 17/30864 707/797 |
| 2015/0347528 A1* | 12/2015 | Jugel | G06F 17/30554 707/759 |
| 2015/0379013 A1* | 12/2015 | Purcell | G06F 17/30654 707/708 |
| 2016/0034532 A1* | 2/2016 | Ivchenko | G06F 17/30448 707/768 |
| 2016/0063006 A1* | 3/2016 | Belogolov | G06F 17/3064 707/767 |
| 2016/0092508 A1* | 3/2016 | Ivchenko | G06F 17/30554 707/713 |
| 2016/0092582 A1* | 3/2016 | Taber | G06F 17/3066 707/755 |
| 2016/0140233 A1* | 5/2016 | Kumar | G06F 17/30864 707/706 |
| 2016/0179807 A1* | 6/2016 | Kumar | G06F 17/3064 707/706 |
| 2016/0210667 A1* | 7/2016 | Thite | G06Q 30/0256 |

* cited by examiner

REARRANGING SEARCH OPERATORS

CROSS-REFERENCE TO RELATED APPLICATIONS

This application claims priority to U.S. Provisional Application No. 62/057,983, filed on Sep. 30, 2014, and entitled, "REARRANGING SEARCH OPERATORS," which is hereby incorporated by reference in its entirety as if set forth herein.

TECHNICAL FIELD

The present application relates generally to data processing systems and, in one specific example, to methods and systems of rearranging search operators for a search query.

BACKGROUND

Current processing of search queries suffers from excessive computational expense. This deficiency is especially apparent with nested search queries that lack a required term.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
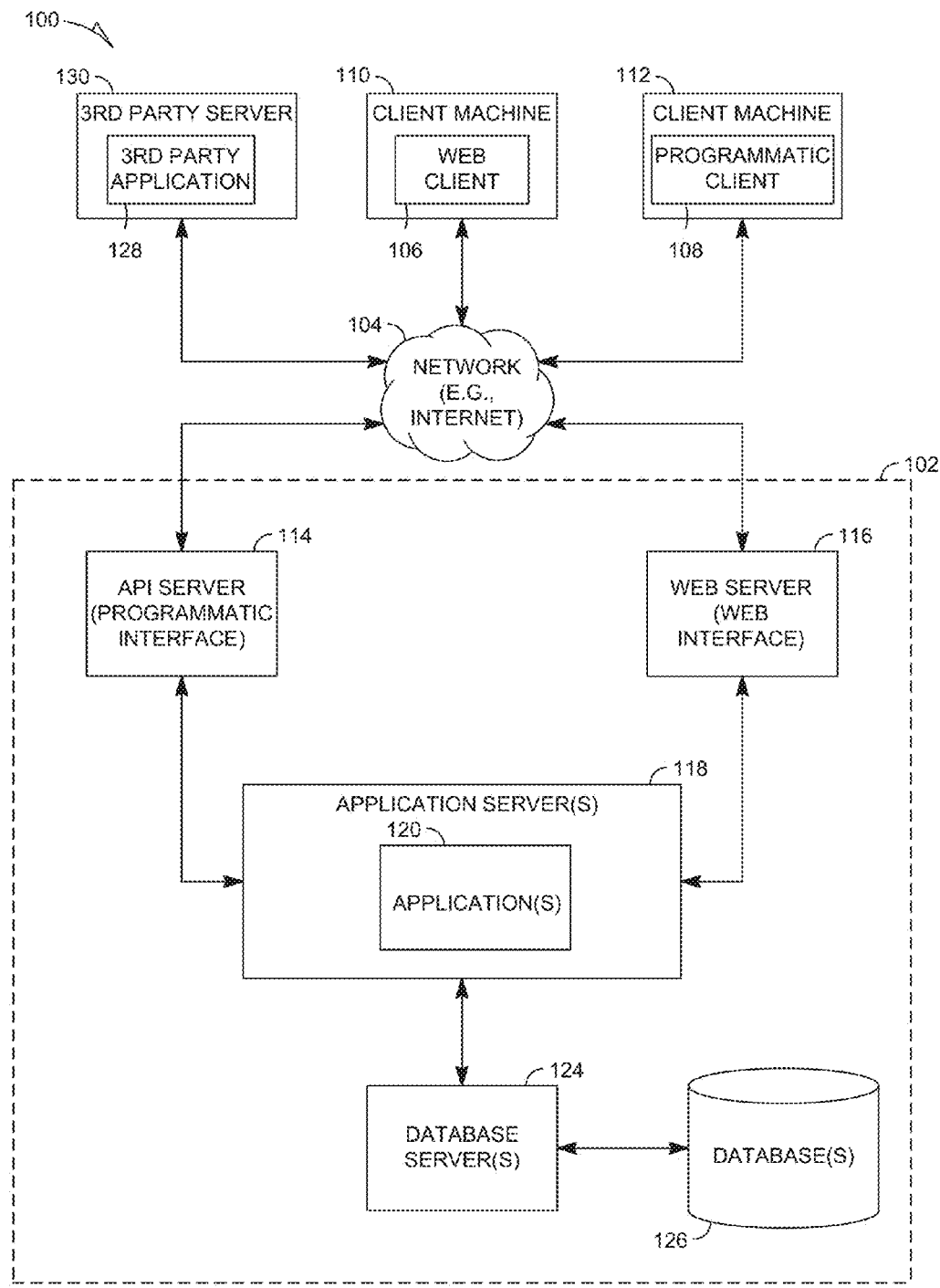
FIG. 1 is a block diagram illustrating a client-server system, in accordance with an example embodiment.

Example methods and systems of rearranging search operators of a search query in generating a rewritten search query are disclosed. In the following description, for purposes of explanation, numerous specific details are set forth in order to provide a thorough understanding of example embodiments. It will be evident, however, to one skilled in the art that the present embodiments may be practiced without these specific details.

In some example embodiments, a first initial search query is received from a first user. The first initial search query comprises at least one search operator and at least one search term. A first rewritten search query is generated based on the first initial search query. The generating of the first rewritten search query comprises rewriting at least one optional search operator in the first initial search query using at least one required search operator and at least one exclusion search operator in response to a determination that the first initial search query comprises the at least one optional search operator and does not comprise any required search operators. A first set of search results is generated for the first rewritten search query, and the first set of search results is caused to be presented to the first user.

In some example embodiments, rewriting the at least one optional search operator in the first initial search query using the at least one required search operator and the at least one exclusion search operator comprises using one of the at least one exclusion search operator at a beginning of the first rewritten search query. In some example embodiments, rewriting the at least one optional search operator in the first initial search query using the at least one required search operator and the at least one exclusion search operator comprises replacing at least one of the at least one optional search operator from the first initial search query with one of the at least one exclusion search operator in the first rewritten search query.

In some example embodiments, a second initial search query is received from a second user. The second initial search query comprises at least one search operator and at least one search term. A second rewritten search query is generated based on the second initial search query. The generating of the second rewritten search query comprises rewriting an optional search operator in the second initial search query as a required search operator in the second rewritten search query in response to a determination that the optional search operator is the only search operator in the second initial search query. A second set of search results is generated for the second rewritten search query, and the second set of search results is caused to be presented to the second user.

In some example embodiments, a second initial search query is received from a second user. The second initial search query comprises at least one search operator and at least one search term. A second rewritten search query is generated based on the second initial search query. The generating of the second rewritten search query comprises maintaining all required clauses and exclusion clauses from the second initial search query in the second rewritten search query and removing all optional clauses in the second initial search query from the second rewritten search query in response to a determination that the second initial search query comprises at least one required search operator. A second set of search results is generated for the second rewritten search query, and the second set of search results is caused to be presented to the second user.

In some example embodiments, the first set of search results is generated based on a search of content of an online social networking service. In some example embodiments, the first rewritten search query is generated in response to a user-generated interrupt, the user generated interrupt comprising a submission by the first user of the first initial search query.

The methods or embodiments disclosed herein may be implemented as a computer system having one or more modules (e.g., hardware modules or software modules). Such modules may be executed by one or more processors of the computer system. One or more of the modules can be combined into a single module. The methods or embodiments disclosed herein may be embodied as instructions stored on a machine-readable medium that, when executed by one or more processors, cause the one or more processors to perform the instructions.

FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to he coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, the any of these devices may be employed by a user to use the features of the present disclosure. in some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
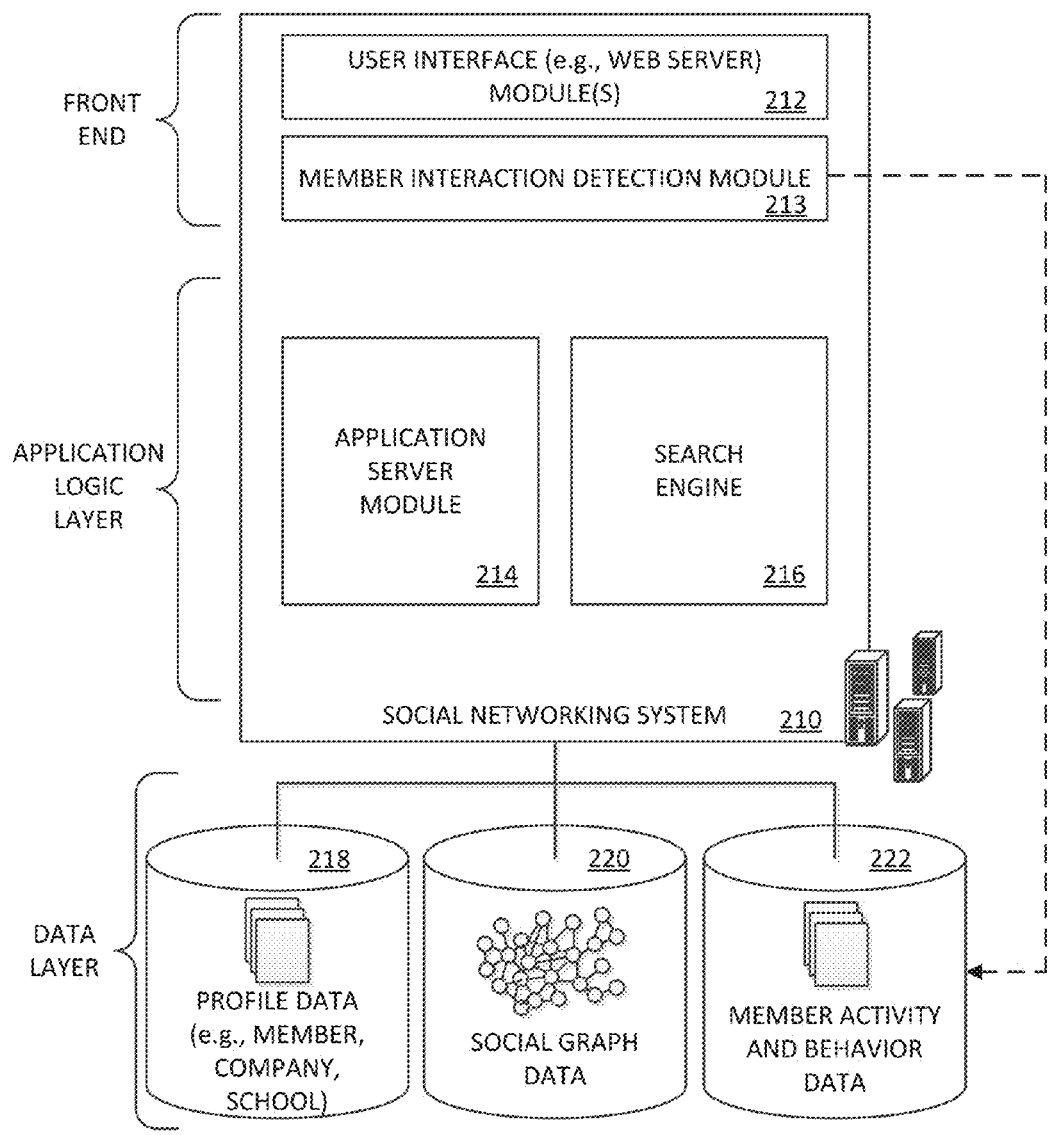
FIG. 2 is a block diagram showing the functional components of a social network service within a networked system, in accordance with an example embodiment.

In some embodiments, the networked system 102 may comprise functional components of a social network service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on application server 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transport Protocol (HTTP) requests, or other web-based, application programming interface (API) requests. In addition, a member interaction and detection module 213 may be provided to detect various interactions that members have with different applications, services and content presented. As shown in FIG. 2, upon detecting a particular interaction, the detection module 213 logs the interaction, including the type of interaction and any meta-data relating to the interaction, in the activity and behavior database with reference number 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service.

As shown in FIG. 2, a data layer may include several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 218. Similarly, when a representative of an organization initially registers the organization with the social networking service, the representative may be prompted to provide certain information about the organization. This information may be stored, for example, in the database with reference number 218, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bilateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with reference number 220.

As members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 2 by the database with reference number 222. This logged activity information may then be used by the search engine 216 to determine search results for a search query.

In some embodiments, databases 218, 220, and 222 may be incorporated into database(s) 126 in FIG. 1. However, other configurations are also within the scope of the present disclosure.

Although not shown, with some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

Figure 3:
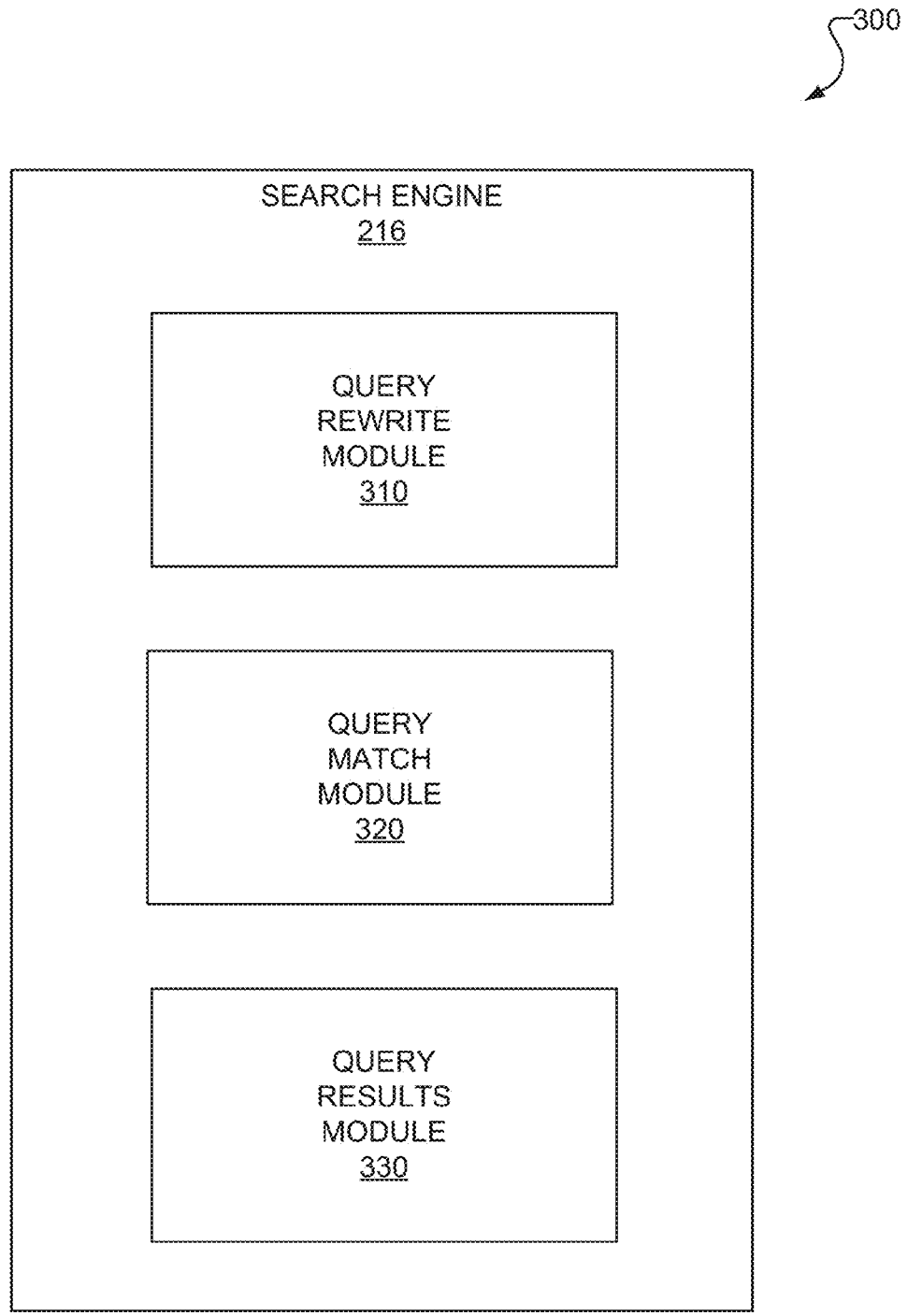
FIG. 3 is a block diagram illustrating components of a system fir rearranging search operators, in accordance with an example embodiment.

FIG. 3 is a block diagram illustrating components of a system 300 for rearranging search operators, in accordance with an example embodiment. The system 300 can comprise the search engine 216. In some embodiments, the search engine 216 can comprise any combination of one or more of a query rewrite module 310, a query match module 320, and a query results module 330. One or more of the modules 310, 320, and 330 can be combined into a single module. These modules 310, 320, and 330 can reside on a machine having a memory and at least one processor (not shown). In some embodiments, these modules 310, 320, and 330 can be incorporated into the application server(s) 118 in FIG. 1. However, it is contemplated that other configurations are also within the scope of the present disclosure.

Query rewrite module 310 can be configured to receive an initial search query comprising one or more search terms from a user of the search engine 216. The initial search query can be provided to the query rewrite module 310 in the form of one or more clauses, with each clause comprising a corresponding search operator and search term (or operand). A search operator is a language construct that can behave like a function for a search query and narrow the search results of the search query. Search operators can comprise functional words or signs that instruct, or otherwise indicate to, the search engine 216 how to connect or separate the given search terms. Boolean operators, such as AND, OR, and NOT are examples of search operators. In some embodiments, the search operators comprise a "required" operator that indicates that search engine 216 should only include, in the search results, records that contain the term to which the required operator is being applied, an "optional" operator that indicates that the search engine 216 should attempt to include, in the search results, records that contain the term to which the optional operator is being applied without requiring that the term be present in the search results, and an "exclusion" operator that indicates that the search engine 216 should exclude, from the search results, any records that contain the term to which the exclusion operator is being applied.

Figure 4:
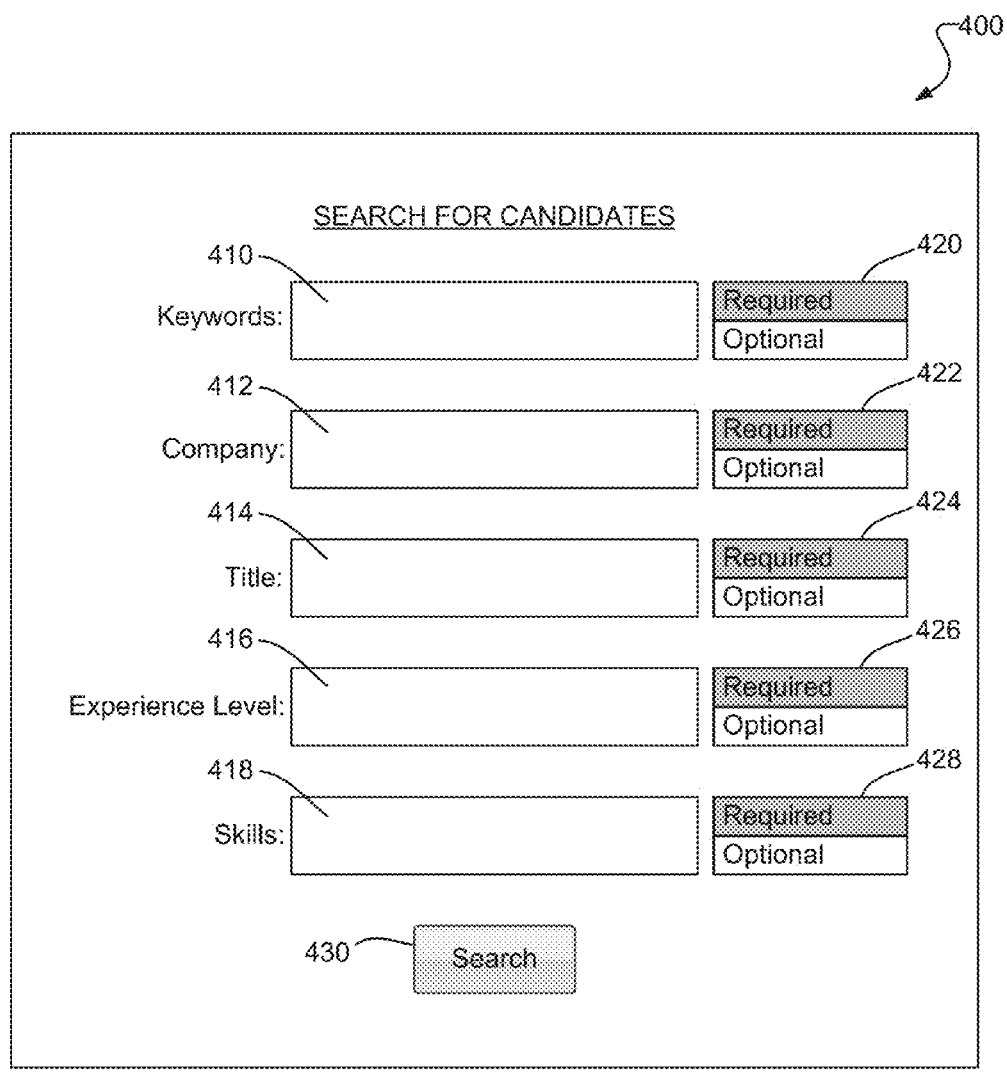
FIG. 4 illustrates a search page, in accordance with an example embodiment.

FIG. 4 illustrates a search page 400, in accordance with an example embodiment. In this example, a user (e.g., a recruiter) can use the search page 400 to search a social networking website for candidates for a job opening. In some embodiments, the user can input search terms or conditions via one or more user interface (UI) input elements, such as fields 410, 412, 414, 416, and 418. These search terms can then be used as part of the search query. The UI input elements can include, but are not limited to, text fields, drop-down fields, list-boxes, check-boxes, and option buttons. The user can also input whether a term is to be treated as required or optional via one or more UI input elements, such as list boxes 420, 422, 424, 426, and 428. For example, in FIG. 4, the user can enter the term "software" in the Keyword field 410, select the "Required" option in list box 420, and select the "Search" button 430 in order to perform a search that requires that the search results include only results that include the term "software". Similarly, the user can provide input indicating that a search term be considered optional for the search results by selecting the "Optional" option in the corresponding list box. Although not shown, a selectable option can also be provided to enable the user to indicate that the search results should exclude any records that contain a particular term.

These indications to treat the search terms as required, optional, or excluded can cause an initial search query to include corresponding search operators. In some embodiments, the symbol "+" is used as the required operator, the symbol "?" is used as the optional operator, and the symbol "−" is used as the exclusion operator. It is contemplated that other symbols, characters, or terms can be used as the search operators.

Query rewrite module 310 can be configured to generate a rewritten search query based on initial search query. The query rewrite module 310 can employ rules in generating the rewritten search query. One rule that can be used is that when the initial search query comprises only one optional search operator and no required search operator, the query rewrite module 310 can treat the corresponding search term as being required. For example, if the initial search query is ?(−A), it can be rewritten as +(−A). Here, the optional operator "?" has been changed to a required operator "+".

Another rule that can be used is that when the initial search query comprises at least one required search operator, the query rewrite module 310 can keep the required clauses and any exclusion clauses, while removing the optional clauses. For example, if the initial search query is ?(−A) +B −C, it can be rewritten as +B−C. Here, required clause +B and the exclusion clause −C have been kept, while the optional clause ?(−A) has been removed.

Yet another rule that can be used is that when the initial search query comprises one or more optional operators and lacks any required operators, the query rewrite module 310 can rewrite the search query using one or more required operators and one or more exclusion operators. In some example embodiments, this rewrite comprises rewriting the optional search operator(s) in the initial search query using the required search operator(s) and the exclusion search operator(s). Rewriting the optional search operator(s) in the initial search query using the required search operator(s) and the exclusion search operator(s) can comprise using one of the exclusion search operator(s) at a beginning of the rewritten search query. Rewriting the optional search operator(s) in the initial search query using the search operator(s) and the exclusion search operator(s) can additionally or alternatively comprise replacing at least one of the optional search operator(s) from the initial search query with one of the exclusion search operator(s) in the rewritten search query.

Figure 5:
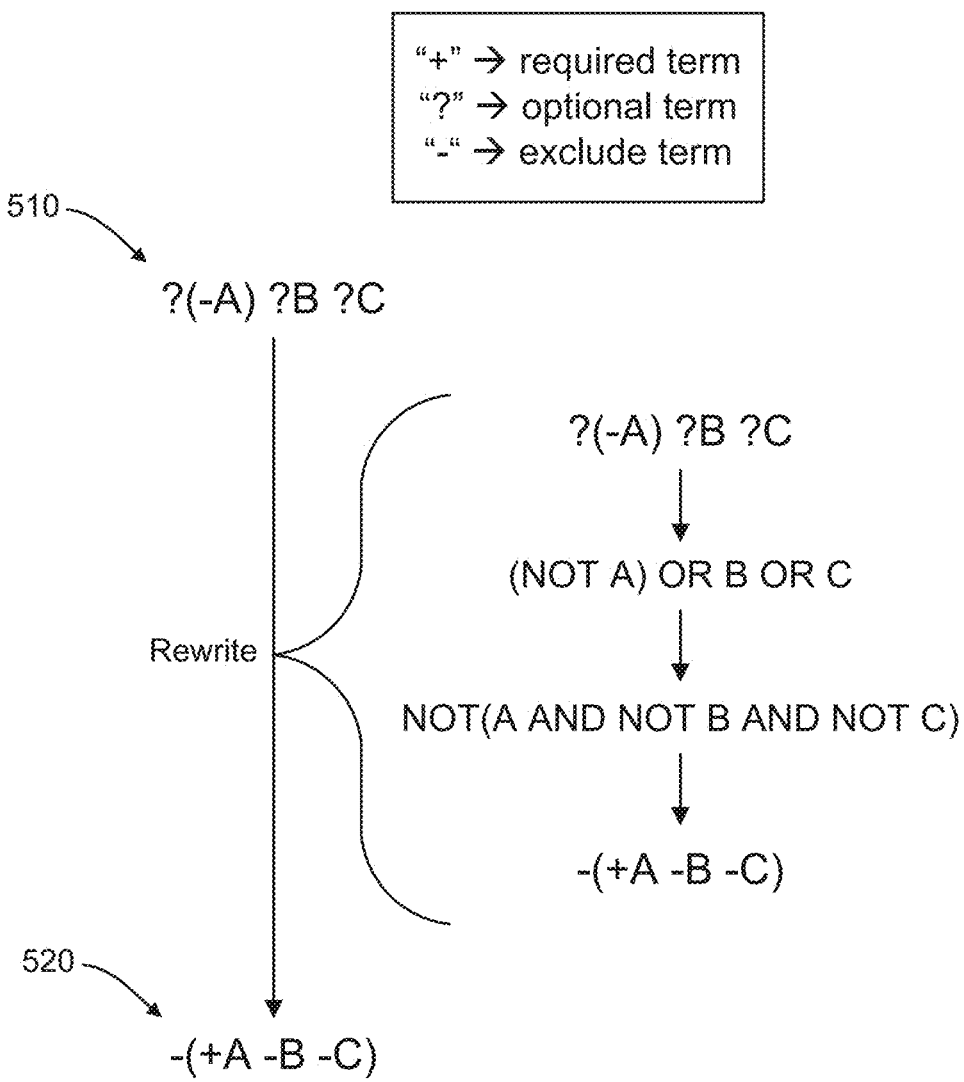
FIG. 5 is a diagram illustrating a rewrite of a search query, in accordance with an example embodiment.

This rule and corresponding rewrite is exemplified in FIG. 5, which is a diagram illustrating a rewrite of a search query, in accordance with an example embodiment. In FIG. 5, the initial search query 510 is ?(−A) ?B ?C. This initial search query comprises three clauses. ?(−A) is one clause, ?B is another clause, and ?C is yet another clause. This initial search query also comprises three optional operators "?" and lacks any required operators "+". Therefore, this initial search query 510 can be rewritten as rewritten search query 520 using one or more required operators "+" and one or more exclusion operators "−". The rewritten search query 520 is (+A−B−C). As seen in this example, the exclusion operator "−" can be used to introduce at least one required operator "+" into the search query by inserting an exclusion operator "−" at the beginning of the search query and then rewriting the clauses based on the presence of the exclusion operator "−" at the beginning of the search query.

Boolean logic can be used to understand how the search query can be rewritten to introduce a required operator "+" using an exclusionary operator "−". In some embodiments, the required operator "+" can be treated as an AND operator, the optional operator "?" can be treated as an OR operator, and the exclusion operator − can be treated as a NOT operator. As seen in FIG. 5, the initial search query ?(−A) ?B ?C can be translated into (NOT A) OR B OR C, which can then be translated into NOT(A AND NOT B AND NOT C), which can then be translated into −(+A−B−C).

In some example embodiments, the rules above can be used recursively in an attempt to eliminate queries that have only negative clauses on the same level of an expression tree (e.g., within the same parenthesis). For example, an initial search query of +(?(−A) ?B ?C) ?D can be translated into a rewritten search query of −(+A−B−C) by applying the rules above. Query +A−B−C does not impose any problems, as it has a positive clause +A on the same level as −B−C.

Query match module 320 can be configured to receive the rewritten search query (e.g., from query rewrite module 310). Query match module 320 can then determine search results for the rewritten search query, (e.g., from a search index comprising a plurality of documents based on the rewritten search query). The search results can comprise profiles of users of a social networking website, However, other types of search results (e.g., any type of documents that are part of a search index) are within the scope of the present disclosure.

Query results module 330 can be configured to cause any of the search results of the rewritten search query to be presented (e.g., displayed) to a user, such as to the user that submitted the initial search query. The query results module 330 can be configured to determine an order in which to present the search results, such as by scoring, ranking, and ordering the search results.

Figure 6:
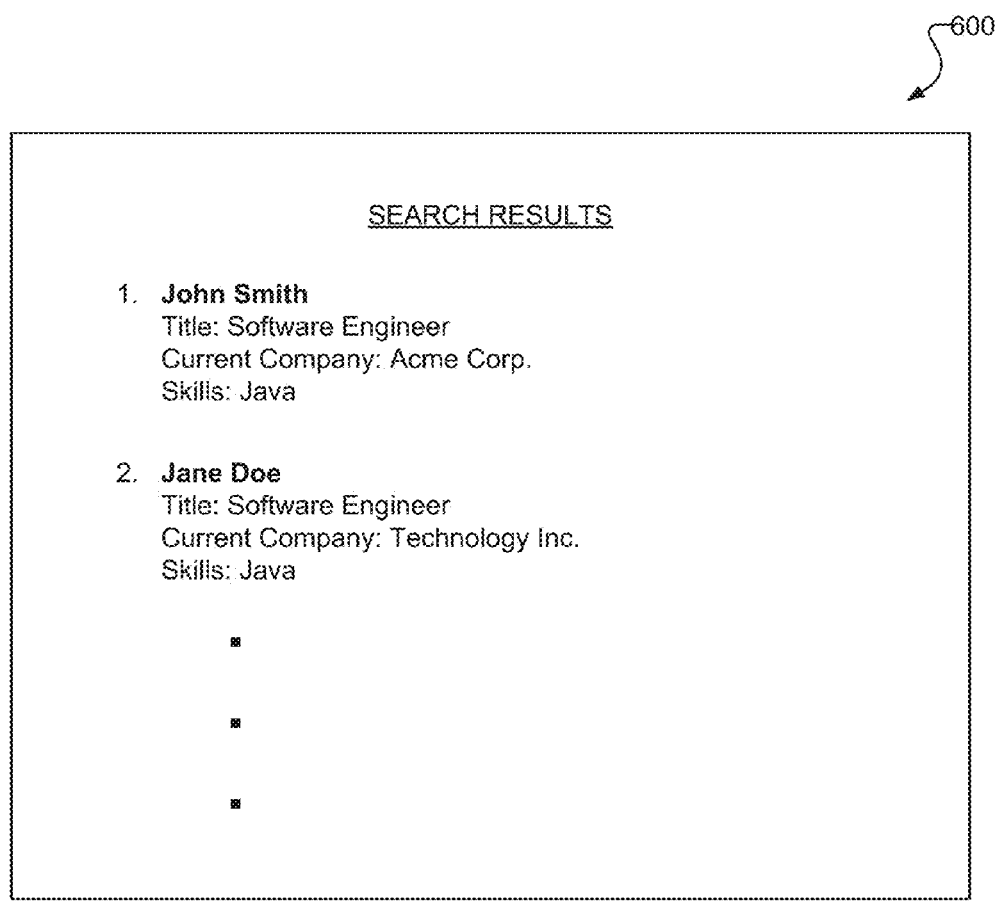
FIG. 6 illustrates a search results page, in accordance with an example embodiment.

FIG. 6 illustrates a search results page 600, in accordance with an example embodiment. The search results page 600 can display the search results, such as user profiles, to the user that initiated the search query. The search results can comprise links to the corresponding user profiles, thereby enabling the user to explore more detailed information about the search results.

Figure 7:
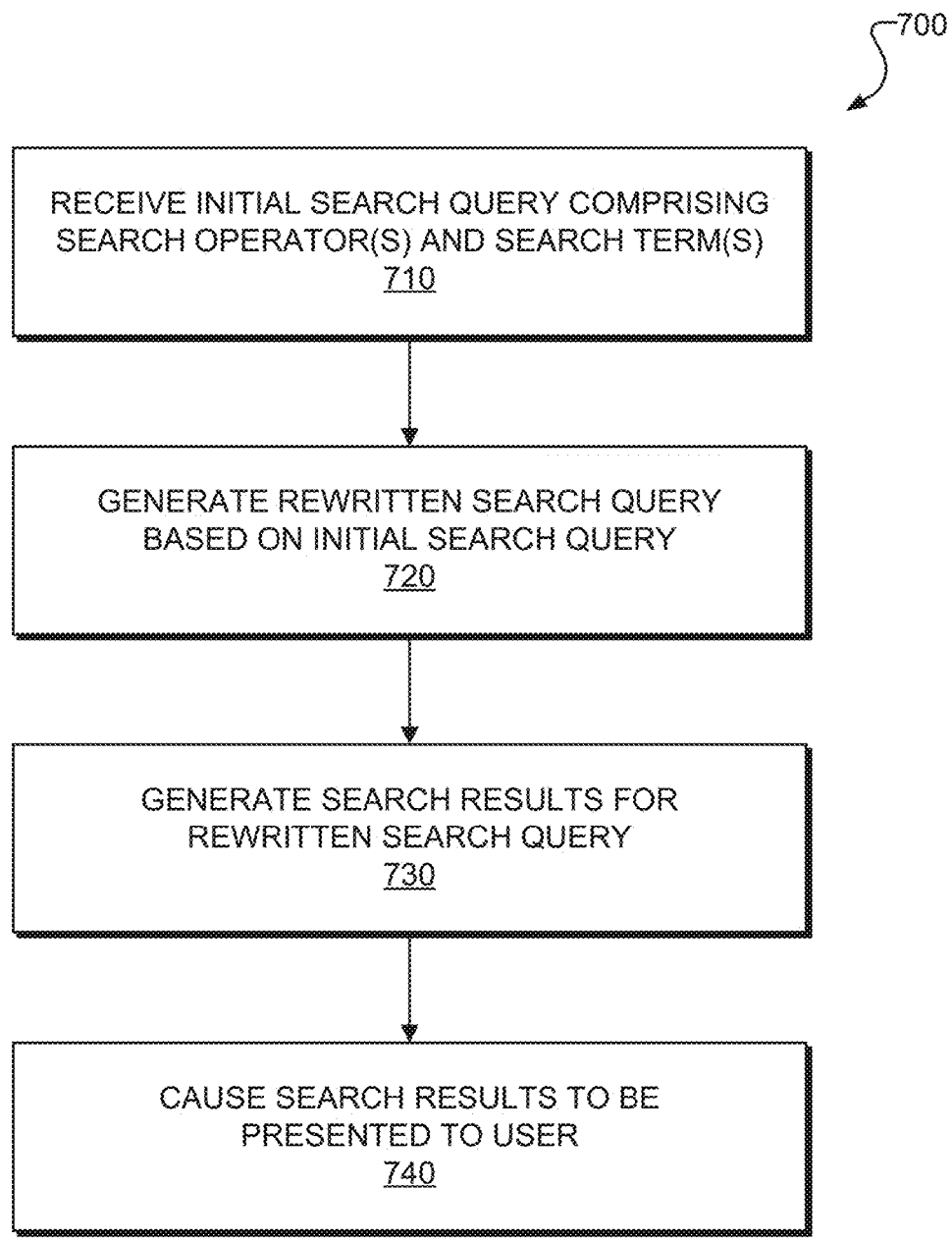
FIG. 7 is a flowchart illustrating a method of rearranging search operators, in accordance with another example embodiment.

FIG. 7 is a flowchart illustrating a method 700 of rearranging search operators, in accordance with another example embodiment. Method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the search engine 216 of FIGS. 2-3, or any combination of one or more of its modules, as described above.

At operation 710, an initial search query can be received. The initial search query can comprise one or more search operators and one or more corresponding search terms. At operation 720, a rewritten search query can be generated based on the initial search query. At operation 730, search results for the rewritten search query can be generated. At operation 740, the search results can be caused to be displayed or otherwise presented to the user. It is contemplated that any of the other features described within the present disclosure can be incorporated into method 700.

Figure 8:
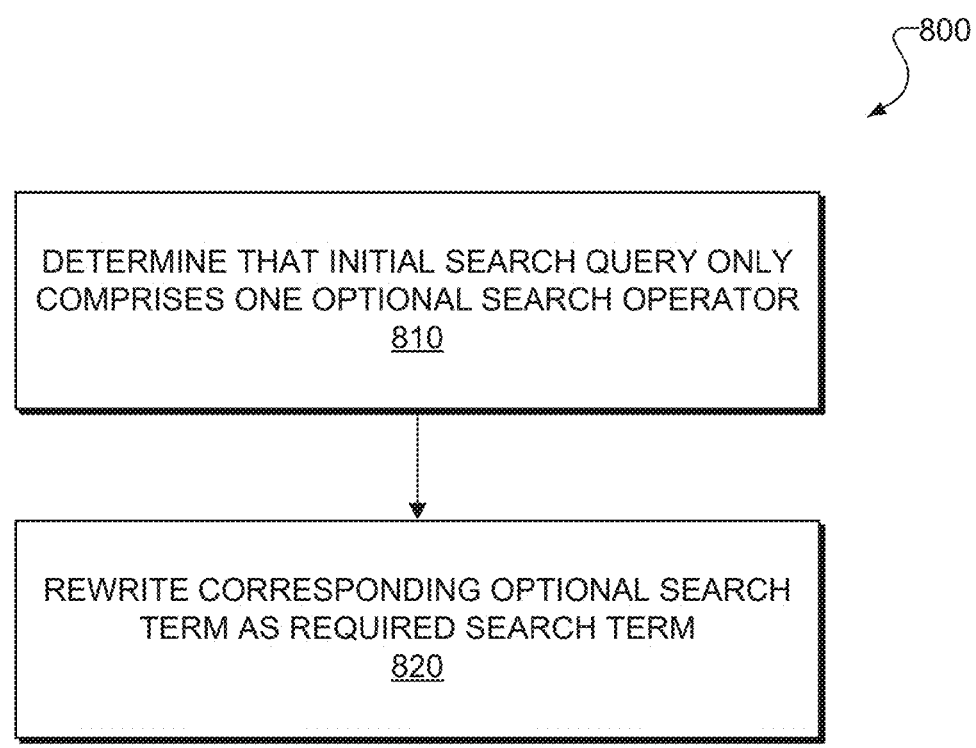
FIG. 8 is a flowchart illustrating a method of rearranging search operators, in accordance with another example embodiment.

FIG. 8 is a flowchart illustrating a method 800 of rearranging search operators, in accordance with another example embodiment. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the search engine 216 of FIGS. 2-3, or any combination of one or more of its modules, as described above.

At operation 810, it can be determined that an initial search query only comprises one optional search operator and no required search operators. At operation 820, an optional search term corresponding to the optional search operator can be rewritten as a required search term. It is contemplated that any of the other features described within the present disclosure can be incorporated into method 800

Figure 9:
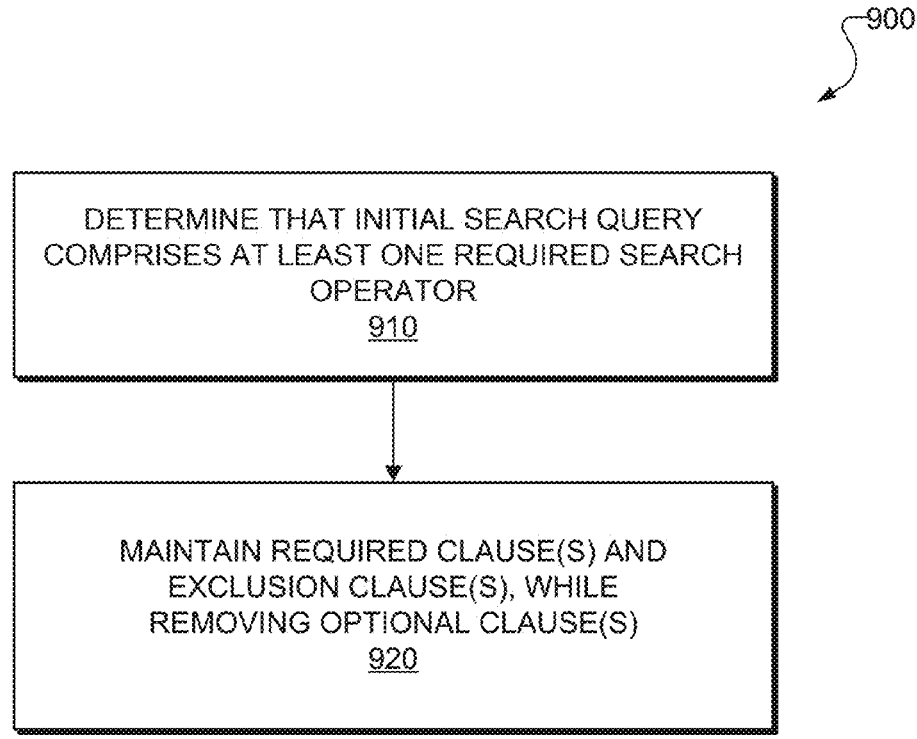
FIG. 9 is a flowchart illustrating a method of rearranging search operators, in accordance with another example embodiment.

FIG. 9 is a flowchart illustrating a method 900 of rearranging search operators, in accordance with another example embodiment. Method 900 can be performed by processing logic that can comprise hardware (e.g., circuitry, dedicated logic, programmable logic, microcode, etc.), software (e.g., instructions run on a processing device), or a combination thereof In one implementation, the method 900 is performed by the search engine 216 of FIGS. 2-3, or any combination of one or more of its modules, as described above.

At operation 910, it can be determined that an initial search query comprises at least one required search operator. At operation, 920, the initial search query can be rewritten, maintaining the required clause(s) and any exclusion clauses from the initial search query, while removing all of the optional clauses (e.g., optional operators and their corresponding terms). It is contemplated that any of the other features described within the present disclosure can be incorporated into method 900.

Figure 10:
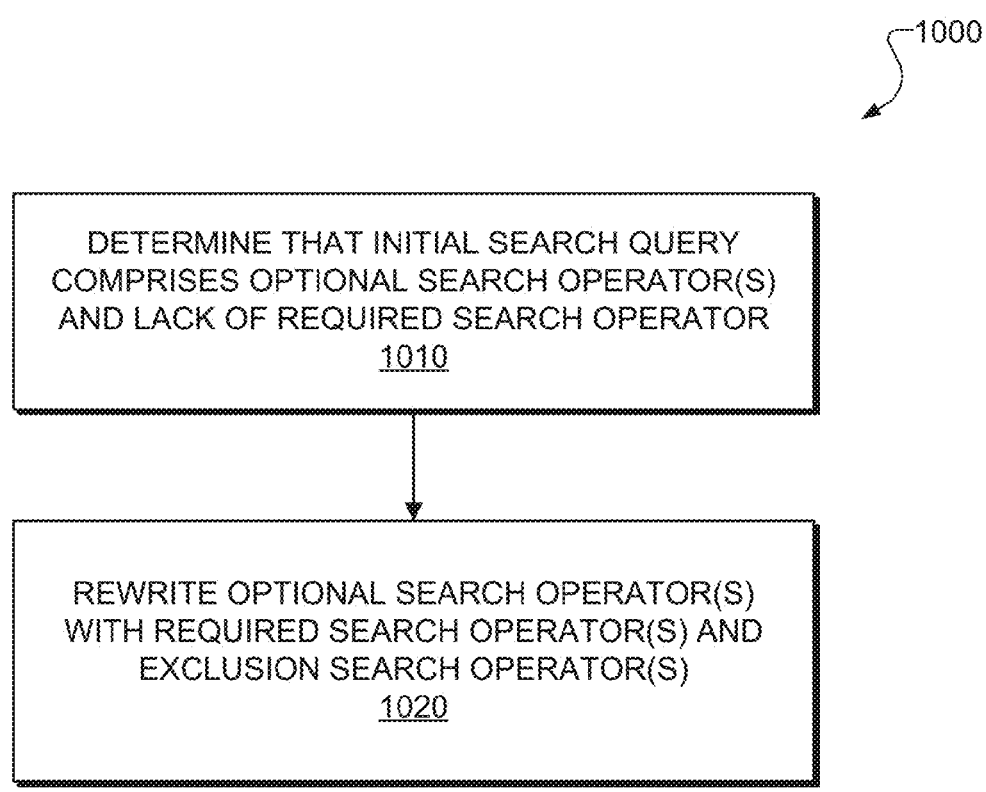
FIG. 10 is a flowchart illustrating a method of rearranging search operators, in accordance with another example embodiment.

FIG. 10 is a flowchart illustrating a method 1000 of rearranging search operators, in accordance with another example embodiment. Method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the search engine 216 of FIGS. 2-3, or any combination of one or more of its modules, as described above.

At operation 1010, it can be determined that an initial search query comprises one or more optional search operators and lacks any required search operator. At operation 1020, the initial search query can be rewritten, rewriting at least one optional search operator from the initial search query with at least one required search operator and at least one exclusion operator. As previously discussed, rewriting the optional search operator(s) in the initial search query using the required search operator(s and the exclusion search operator(s) can comprise using one of the exclusion search operator(s) at a beginning of the rewritten search query. Rewriting the optional search operator(s) in the initial search query using the search operator(s) and the exclusion search operator(s) can additionally or alternatively comprise replacing at least one of the optional search operator(s) from the initial search query with one of the exclusion search operator(s) in the rewritten search query. It is contemplated that any of the other features described within the present disclosure can be incorporated into method 1000.

Example Mobile Device

Figure 11:
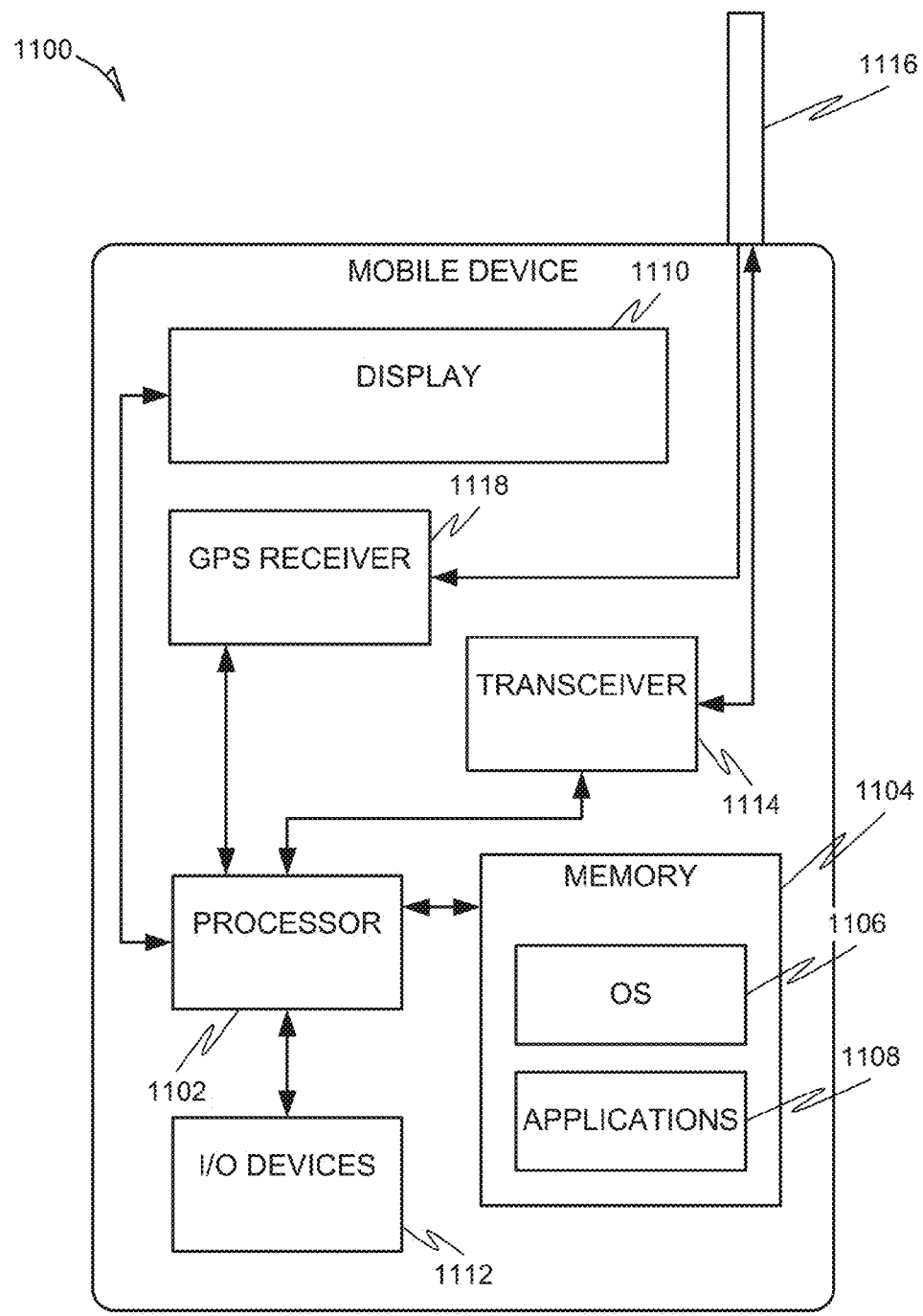
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location enabled application that can provide LBSs to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
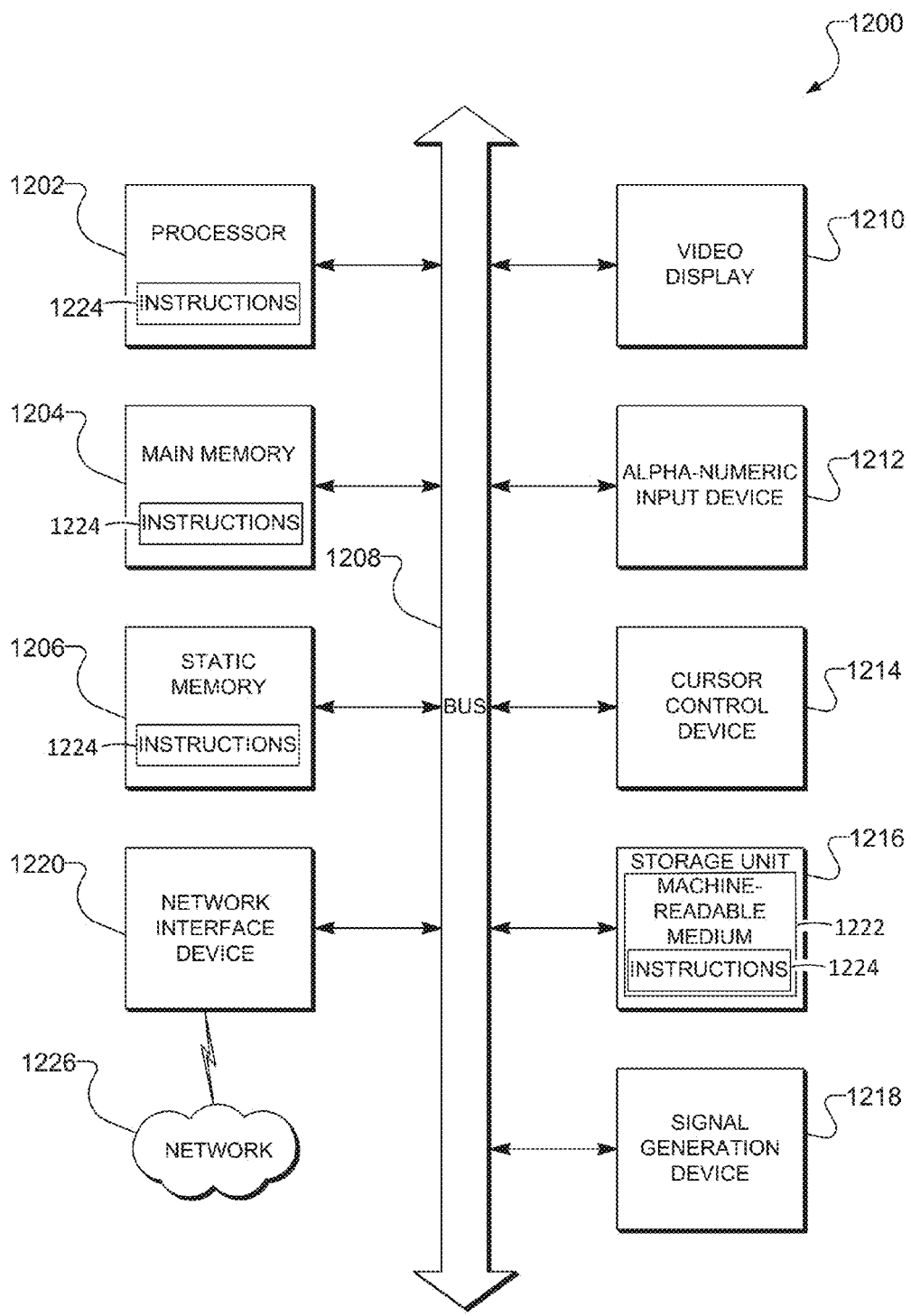
FIG. 12 is a block diagram of an example computer system on which methodologies described herein may be executed, in accordance with an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (Up navigation device 1214 (e.g., a mouse), a disk drive unit 1216, a signal generation device 1218 (e.g., a speaker) and a network interface device 1770.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    at least one processor; and
    a non-transitory machine-readable medium embodying a set of instructions that, when executed by the at least one processor, cause the at least one processor to perform operations, the operations comprising:
    receiving an initial search query from a user, the initial search query comprising at least one search operator and at least one search term;
    generating a rewritten search query based on the initial search query, the generating the rewritten search query comprising rewriting at least one optional search operator in the initial search query using at least one required search operator and at least one exclusion search operator in response to a determination that the initial search query comprises the at least one optional search operator and does not comprise any required search operators;
    generating search results for the rewritten search query; and
    causing the search results to be presented to the user.

2. The system of claim 1, wherein rewriting the at least one optional search operator in the initial search query using the at least one required search operator and the at least one exclusion search operator comprises using one of the at least one exclusion search operator at a beginning of the rewritten search query.

3. The system of claim 1, wherein rewriting the at least one optional search operator in the initial search query using the at least one required search operator and the at least one exclusion search operator comprises replacing at least one of the at least one optional search operator from the initial search query with one of the at least one exclusion search operator in the rewritten search query.

4. The system of claim 1, wherein the operations further comprise rewriting an optional search operator in the initial search query as a required search operator in the rewritten search query in response to a determination that the optional search operator is the only search operator in the initial search query.

5. The system of claim 1, wherein the operations further comprise generating the rewritten search query by maintaining all required clauses and exclusion clauses and removing all optional clauses in response to a determination that the initial search query comprises at least one required search operator.

6. The system of claim 1, wherein the operations further comprise generating the search results based on a search of content of an online social networking service.

7. The system of claim 1, wherein the operations further comprise generating the rewritten search query in response to a user-generated interrupt, the user generated interrupt comprising a submission by the user of the initial search query.

8. A computer-implemented method comprising:
    receiving a first initial search query from a first user, the first initial search query comprising at least one search operator and at least one search term;

generating, by at least one processor, a first rewritten search query based on the first initial search query, the generating the first rewritten search query comprising rewriting at least one optional search operator in the first initial search query using at least one required search operator and at least one exclusion search operator in response to a determination that the first initial search query comprises the at least one optional search operator and does not comprise any required search operators;

generating a first set of search results for the first rewritten search query; and causing the first set of search results to be presented to the first user.

9. The method of claim 8, wherein rewriting the at least one optional search operator in the first initial search query using the at least one required search operator and the at least one exclusion search operator comprises using one of the at least one exclusion search operator at a beginning of the first rewritten search query.

10. The method of claim 8, wherein rewriting the at least one optional search operator in the first initial search query using the at least one required search operator and the at least one exclusion search operator comprises replacing at least one of the at least one optional search operator from the first initial search query with one of the at least one exclusion search operator in the first rewritten search query.

11. The method of claim 8, further comprising:
receiving a second initial search query from a second user, the second initial search query comprising at least one search operator and at least one search term;
generating a second rewritten search query based on the second initial search query, the generating the second rewritten search query comprising rewriting an optional search operator in the second initial search query as a required search operator in the second rewritten search query in response to a determination that the optional search operator is the only search operator in the second initial search query;
generating a second set of search results for the second rewritten search query; and
causing the second set of search results to be presented to the second user.

12. The method of claim 8, further comprising:
receiving a second initial search query from a second user, the second initial search query comprising at least one search operator and at least one search term;
generating a second rewritten search query based on the second initial search query, the generating the second rewritten search query comprising maintaining all required clauses and exclusion clauses from the second initial search query in the second rewritten search query and removing all optional clauses in the second initial search query from the second rewritten search query in response to a determination that the second initial search query comprises at least one required search operator;
generating a second set of search results for the second rewritten search query; and
causing the second set of search results to be presented to the second user.

13. The method of claim 8, wherein the first set of search results are generated based on a search of content of an online social networking service.

14. The method of claim 8, wherein the first rewritten search query is generated in response to a user-generated interrupt, the user generated interrupt comprising a submission by the first user of the first initial search query.

15. A non-transitory machine-readable medium embodying a set of instructions that, when executed by a processor, cause the processor to perform operations, the operations comprising:
receiving a first initial search query from a first user, the first initial search query comprising at least one search operator and at least one search term;
generating a first rewritten search query based on the first initial search query, the generating the first rewritten search query comprising rewriting at least one optional search operator in the first initial search query using at least one required search operator and at least one exclusion search operator in response to a determination that the first initial search query comprises the at least one optional search operator and does not comprise any required search operators;
generating a first set of search results for the first rewritten search query; and
causing the first set of search results to be presented to the first user.

16. The non-transitory machine-readable medium of claim 15, wherein rewriting the at least one optional search operator in the first initial search query using the at least one required search operator and the at least one exclusion search operator comprises using one of the at least one exclusion search operator at a beginning of the first rewritten search query.

17. The non-transitory machine-readable medium of claim 15, wherein rewriting the at least one optional search operator in the first initial search query using the at least one required search operator and the at least one exclusion search operator comprises replacing at least one of the at least one optional search operator from the first initial search query with one of the at least one exclusion search operator in the first rewritten search query.

18. The non-transitory machine-readable medium of claim 15, wherein the operations further comprise:
receiving a second initial search query from a second user, the second initial search query comprising at least one search operator and at least one search term;
generating a second rewritten search query based on the second initial search query, the generating the second rewritten search query comprising rewriting an optional search operator in the second initial search query as a required search operator in the second rewritten search query in response to a determination that the optional search operator is the only search operator in the second initial search query;
generating a second set of search results for the second rewritten search query; and
causing the second set of search results to be presented to the second user.

19. The non-transitory machine-readable medium of claim 15, wherein the operations further comprise:
receiving a second initial search query from a second user, the second initial search query comprising at least one search operator and at least one search term;
generating a second rewritten search query based on the second initial search query, the generating the second rewritten search query comprising maintaining all required clauses and exclusion clauses from the second initial search query in the second rewritten search query and removing all optional clauses in the second initial search query from the second rewritten search query in response to a determination that the second initial search query comprises at least one required search operator;

generating a second set of search results for the second rewritten search query; and causing the second set of search results to be presented to the second user.

20. The non-transitory machine-readable medium of claim 15, wherein the first rewritten search query is generated in response to a user-generated interrupt, the user generated interrupt comprising a submission by the first user of the first initial search query.

\* \* \* \* \*